(12) United States Patent
Heurguier et al.

(10) Patent No.: US 7,907,089 B2
(45) Date of Patent: Mar. 15, 2011

(54) METHOD FOR TRACKING A TRANSMITTER BY MEANS OF A SYNTHETIC SPARSE ANTENNA NETWORK

(75) Inventors: Dominique Heurguier, Le Perreux sur Marne (FR); Anne Ferreol, Colombes (FR)

(73) Assignee: Thales (FR)

( * ) Notice: Subject to any disclaimer, the term of this patent is extended or adjusted under 35 U.S.C. 154(b) by 191 days.

(21) Appl. No.: 11/569,059

(22) PCT Filed: Apr. 25, 2005

(86) PCT No.: PCT/EP2005/051842
§ 371 (c)(1),
(2), (4) Date: Nov. 13, 2006

(87) PCT Pub. No.: WO2005/111650
PCT Pub. Date: Nov. 24, 2005

(65) Prior Publication Data
US 2007/0216577 A1 Sep. 20, 2007

(30) Foreign Application Priority Data
May 14, 2004 (FR) ..................... 04 05255

(51) Int. Cl.
*G01S 3/02* (2006.01)
(52) U.S. Cl. ..................... 342/465; 342/449
(58) Field of Classification Search .......... 342/351–477
See application file for complete search history.

(56) References Cited

U.S. PATENT DOCUMENTS

| | | | | |
|---|---|---|---|---|
| 3,111,671 | A | * | 11/1963 | Thompson ............... 342/464 |
| 5,526,001 | A | * | 6/1996 | Rose et al. .............. 342/442 |
| 6,542,121 | B1 | * | 4/2003 | Beale et al. ............. 342/442 |
| 7,423,589 | B2 | | 9/2008 | Ferreol et al. |

OTHER PUBLICATIONS

Zhang Xiaofei et al: "Antenna array self-calibration algorithm with sensor location errors" IEEE, Oct. 28, 2003, pp. 225-228, XP010689438.
Marcos et al: "An Adaptive Tracking Algorithm for Direction Finding and Array Shape Estimation in a Monstatinary Environment"; Journal of VLSI Signal Processing Systems for Signal, Image, and Video Technology, Kluwer Academic Publishers, Dordrecht, NL, vol. 14, No. 1, Oct. 1996, pp. 107-118, XP000635061 ISSN: 0922-5773.
Ali M et al: "An algorithm for the calibration of sensor arrays with sensor gain and phase uncertainties"; Statistical Singal and Array Processing. Minneapolis, Apr. 27-30, 2993, Proceedings of the International Conference on Acoustics, Speech, and Signal Processing (ICASSP), New York, IEEE, US vol. 4, Apr. 27, 1993, pp. 121-124, XP010110748; ISBN: 0-7803-0946-4.

(Continued)

*Primary Examiner* — Thomas H Tarcza
*Assistant Examiner* — Nga X Nguyen
(74) *Attorney, Agent, or Firm* — Lowe Hauptman Ham & Berner, LLP (57) ABSTRACT

Method of locating one or more transmitters on the basis of an array of sensors moving with respect to the transmitters comprising at least the following steps:
  determining the direction vectors $\hat{a}_k$ corresponding to the response of the array of sensors to a source with incidence $(\theta, \Delta)$ as a function of the incidence parameters $\theta$, $\Delta$, and of the parameter $\rho$ related to the distortion of the phases on the sensors,
  transforming this vector $\hat{a}_k$ so as to eliminate the unknown parameter $\rho$, into a vector $\hat{c}_{km}, \hat{c}'_{km}$,
  using the transformed vector to obtain the position of the transmitter using a maximized locating criterion.

12 Claims, 4 Drawing Sheets

OTHER PUBLICATIONS

Gustafsson K et al: "Mitigation of wing flexure for airborne direction-finding applications" Signals, Systems and Computers, 1993. 1993 Conference Record of the Twenty-Seventh Asilomar Conference on Pacific Grove, CA, USA Nov. 1-3, 1993, Los Alamitos, CA, USA, IEEE Comput. Soc, Nov. 1, 1993, pp. 1083-1090, XP010096234; ISBN: 0-8186-4120-7.

* cited by examiner

METHOD FOR TRACKING A TRANSMITTER BY MEANS OF A SYNTHETIC SPARSE ANTENNA NETWORK

RELATED APPLICATIONS

The present Application is based on International Application No. PCT/EP2005/051842, filed on Apr. 25, 2005, which in turn corresponds to French Application No. 04 05255 filed on May 14, 2004, and priority is hereby claimed under 35 USC §119 based on these applications. Each of these applications are hereby incorporated by reference in their entirety into the present application.

The invention relates to a method of locating one or more transmitters stationary or mobile on the ground on the basis of the running of a carrier and of an onboard sensor producing the associated direction vectors.

It is applied for example with an array of synthetic sparse antennas.

The prior art describes various procedures for locating one or more transmitters on the basis of running carriers.

Figure 1:
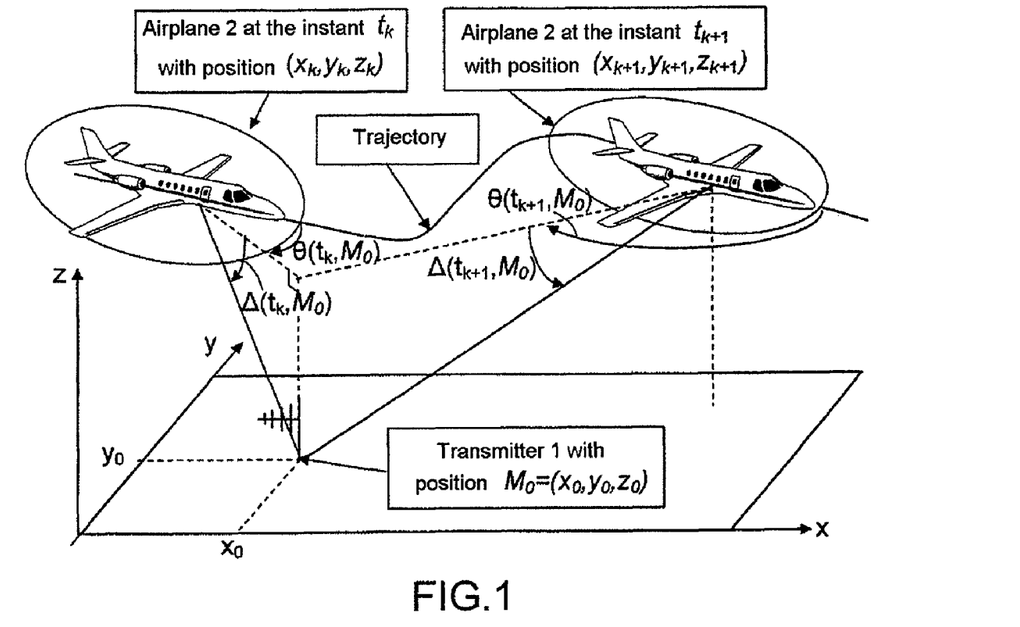
FIG. 1 an exemplary locating of a transmitter by an airplane equipped with an array of suitable sensors, FIG. 2 an array of 5 antennas and the angles of incidence of a transmitter.
Figure 2:
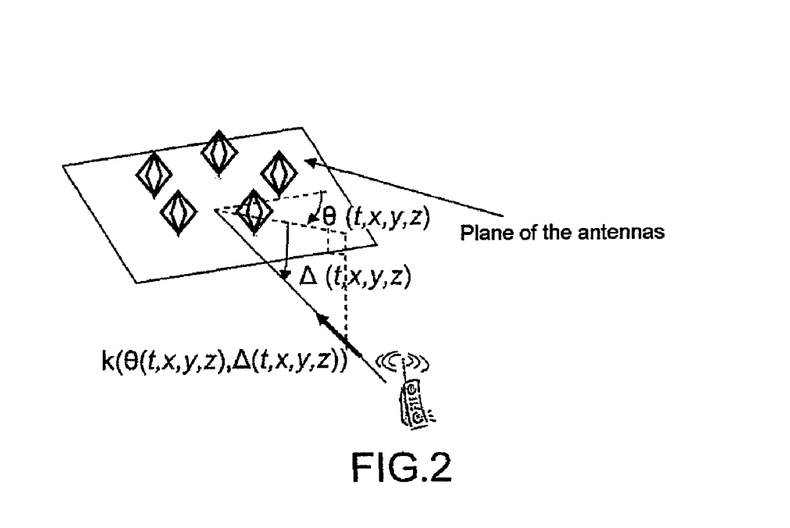

FIG. 1 illustrates an example of airborne locating. The transmitter 1 to be located is at the position $(x_0,y_0,z_0)$; the carrier 2 at the instant $t_k$ is at the position $(x_k,y_k,z_k)$ and sees the transmitter at the incidence $(\theta(t_k,x_0,y_0,z_0), \Delta(t_k,x_0,y_0,z_0))$. The angles $\theta(t,x_0,y_0,z_0)$ and $\Delta(t,x_0,y_0,z_0)$ evolve over time and depend on the position of the transmitter as well as the trajectory of the carrier. The angles $\theta(t,x_0,y_0,z_0)$ and $\Delta(t,x_0,y_0,z_0)$ are for example labeled as shown by FIG. 2 with respect to an array of N antennas that may be fixed under the carrier.

There currently exist several families of locating techniques making it possible to determine the position $(x_m,y_m,z_m)$ of a transmitter on the basis of the direction vectors. These locating techniques differ through the geometric constraints or characteristics of the antennal array; they are classed into several categories cited hereafter.

Use of Unambiguous, Paired, Standardized and Calibrated Arrays and of Goniometry Techniques These techniques are in most cases based on 1D azimuthal goniometry. The azimuths $\theta_{km}=\theta(t_k,x_m,y_m,z_m)$ associated with the $m^{th}$ transmitter are measured for various instants $t_k$. By using the position $(x_k,y_k,z_k)$ of the carrier at this instant k, a position $(x_{mk},y_{mk},z_{mk})$ of this transmitter is estimated through a ground intersection. The position $(x_k,y_k,z_k)$ of the carrier is given by a GPS. Its orientation is given by a compass in the case of a terrestrial carrier, and by a navigation platform in the case of an aircraft. On the basis of all the positions $(x_{mk},y_{mk},z_{mk})$ an extraction of data is performed making it possible to determine the dominant position $(x_m,y_m,z_m)$ of the incident transmitter. Locating is done by triangulation or by ground intersection (2D goniometry). The drawback of triangulation techniques is that they require a significant transit. Moreover, in antennal constraint terms, these goniometry techniques must use an unambiguous array of sensors, and require calibration, pairing and standardization of the channels.

Use of Sparse Array of Paired Antennas

The applicant's patent application FR 03/13128 describes a method which makes it possible to effect direct estimation of the position $(x_m,y_m,z_m)$ of the transmitter on the basis of a multichannel parametric analysis of the direction vectors at various instants $t_k$ over a duration $\Delta t$. This method requires a pairing of the channels as well as a correction of the distortions in phase and in amplitude of the receivers.

The present invention relies on a different approach which does not require, during normal operation, correction of the distortions of the receivers provided that the receiver exhibits a substantially constant response over the locating durations considered.

The invention relates to a method of locating one or more transmitters on the basis of an array of sensors moving with respect to the transmitters characterized in that it comprises at least the following steps:

determining the direction vectors $\hat{a}_k$ corresponding to the response of the array of sensors to a source with incidence $(\theta, \Delta)$ as a function of the incidence parameters $\theta$, $\Delta$, and of the parameter $\rho$ related to the distortion of the phases on the sensors, transforming this vector $\hat{a}_k$ so as to eliminate the unknown parameter $\rho$, into a transformed vector $\hat{c}_{km}, \hat{c}'_{km}$ using the transformed vector to obtain the position of the transmitter using a maximized locating criterion.

The method according to the invention exhibits the following advantages in particular:

It allows direct estimation of the positions of each of the transmitters on the basis of a multichannel parametric analysis at various instants t, It makes it possible to use of arrays sparse sensor that are unpaired, or even uncalibrated (large-aperture array), It makes it possible to circumvent the pairing as well as the calibration in amplitude and in phase of the reception channels, It is possible to take into account a model on the variation in the signal reception level, it makes it possible to introduce any observation model deduced from the direction vectors at different observation instants, it is possible according to a variant to consider the whole set of channels, without taking a particular reference channel.

Other characteristics and advantages of the invention will be better apparent on reading the description which follows of an example given by way of wholly nonlimiting illustration with appended figures which represent.

In order to better understand the principle implemented in the present invention, the example which follows is given by way of wholly nonlimiting illustration for a system such as shown diagrammatically in FIG. 1, comprising an airplane 2 equipped with an array of N sensors and with a processor adapted for executing the steps of the method according to the invention and with a transmitter 1 on the ground to be located.

In the presence of M transmitters, the airplane receives at the instant t at the output of the N sensors of the array, the vector x(t). Around the instant $t_k$, the vector $x(t+t_k)$ of dimension N×1 is the mixture of the signals of the M transmitters:

$$x(t+t_k) = \begin{bmatrix} x_1(t+t_k) \\ M \\ x_N(t+t_k) \end{bmatrix} \quad (1)$$

$$= \sum_{m=1}^{M} a(\theta_{km}, \Delta_{km}, \rho)s_m(t+t_k) + b(t+t_k)$$

$$= A_k(\rho)s(t+t_k) + b(t+t_k)$$

for $|t|<\Delta t/2$ where $b(t)$ is the noise vector assumed Gaussian,
$a(\theta, \Delta, \rho)$ is the response of the array of sensors to a source with incidence $(\theta,\Delta)$ with complex receiver gains,
$\rho$ is a parameter representative of the phase distortion on the various reception channels, $\rho=[\rho_1 \ldots \rho_N N]^T$,
$A_{K\pi}[\alpha(\theta_{K1}, \Delta_{K1},\rho) \ldots, \alpha(\theta_{KM}, \Delta_{KM},\rho)]$, $\sigma(\tau)=[\sigma_1(\tau) \ldots \sigma_M(\tau)]^T$, $\theta_{K\mu}=\theta(\tau_K,\xi_\mu,\psi_\mu,\zeta_\mu)$ and $\Delta_{km}=\Delta(t_k,x_m,y_m,z_m)$ and $x_n(t)$ is the received signal on the $n^{th}$ sensor.

We note that in this model, the mixture matrix $A_{k\rho}$ depends on the instant $t_k$ of observation as well as on the gains of the receivers $\rho$.

The direction vector $a(\theta,\Delta,\rho)$ and the direction vector without phase distortion $v(\theta, \Delta)$ respectively have expressions:

$$a(\theta, \Delta, \rho) = \begin{bmatrix} \rho_1 a_1(\theta, \Delta) \\ M \\ \rho_N a_N(\theta, \Delta) \end{bmatrix} \text{ and } v(\theta, \Delta) = \begin{bmatrix} a_1(\theta, \Delta) \\ M \\ a_N(\theta, \Delta) \end{bmatrix} \quad (2)$$

Where:
$b_n(t)$ is the noise vector of channel n,
$a(\theta, \Delta, \rho)$ is the response of the array of sensors to a source with incidence $(\theta,\Delta)$,
$v(\theta, \Delta)$ is direction vector without distortion for a source with incidence $(\theta,\Delta)$
$A_k(\rho)=[a(\theta_{k1}, \Delta_{k1}, \rho) \ldots a(\theta_{kM}, \Delta_{kM}, \rho)]$,
$\theta_k=\theta(t_k,x_m,y_m,z_m)$ and $\Delta_k=\Delta(t_k,x_m,y_m,z_m)$.

These vectors $a(\theta_{km}, \Delta_{km}, \rho)$ have the feature of depending on the instant $t_k$ and on the position $(x_m,y_m,z_m)$ of the transmitter.

Direction Vector akm

In the presence of model errors, for example coupling, the measured direction vector $\hat{a}_{km}(\rho)$ can be written:

$$\hat{a}_{km}(\rho)=a(\theta(t_k,x_m,y_m,z_m), \Delta(t_k,x_m,y_m,z_m), \rho)+e_{km} \text{ with} \quad (3)$$

$e_{km}$: complex measurement noise dependent on the calibration errors such as coupling.

In particular for an array composed of N=2 sensors spaced apart by a distance of d along the axis of the carrier the direction vector without distortion $v_{km}$ at the instant k satisfies:

$$v_{km} = \begin{bmatrix} 1 \\ \exp\left(j2\pi\frac{d}{\lambda}\cos(\theta(t_k, x_m, y_m, z_m))\right) \\ \cos(\Delta(t_k, x_m, y_m, z_m)) \end{bmatrix} \quad (4)$$

$$= v(t_k, x_m, y_m, z_m)$$

The incidence $(\theta(t_k,x_m,y_m,z_m), \Delta(t_k,x_m,y_m,z_m))$ can be calculated directly on the basis of the position $(x_m,y_m,z_m)$ of the carrier at the instant $t_k$ and of the position $(x_m,y_m,z_m)$ of the transmitter.

The basic idea of the method relies notably on the fact that the parameter $\rho$ is independent of the incidence $(\theta, \Delta)$ of the sources, the vector $\rho$ not being estimated by standardization or by any other procedure before or during normal operation of the system.

First Variant of Implementation of the Method Using Vectors $c_{km}$

Figure 3:
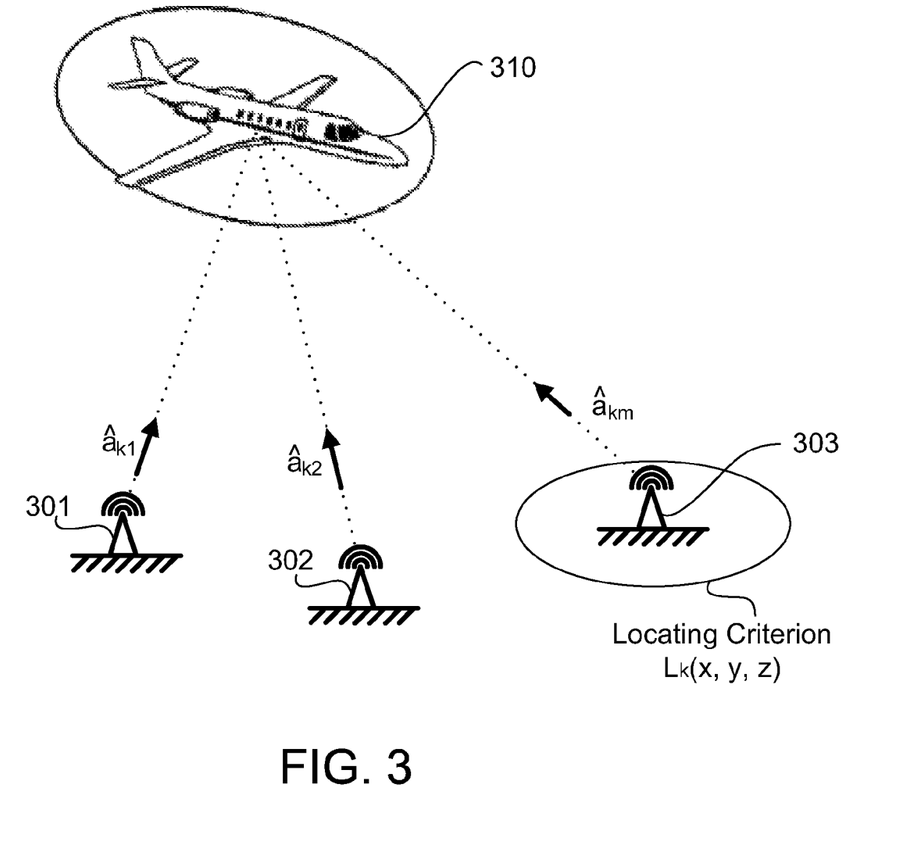
FIG. 3 is a perspective view of relationship between an airplane and M transmitters according to an embodiment.
Figure 4:
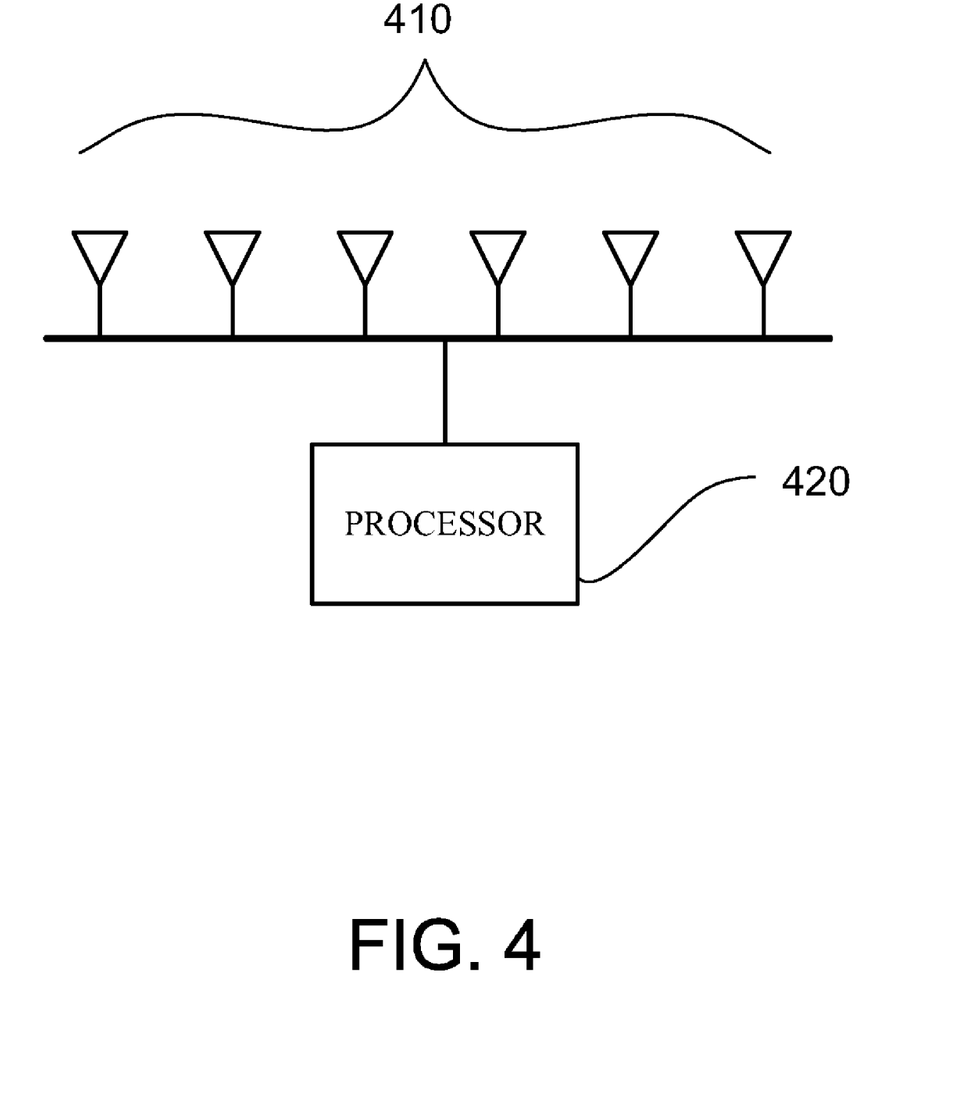
FIG. 4 is a system diagram of sensors and a processor on the airplane according to an embodiment.
Figure 5:
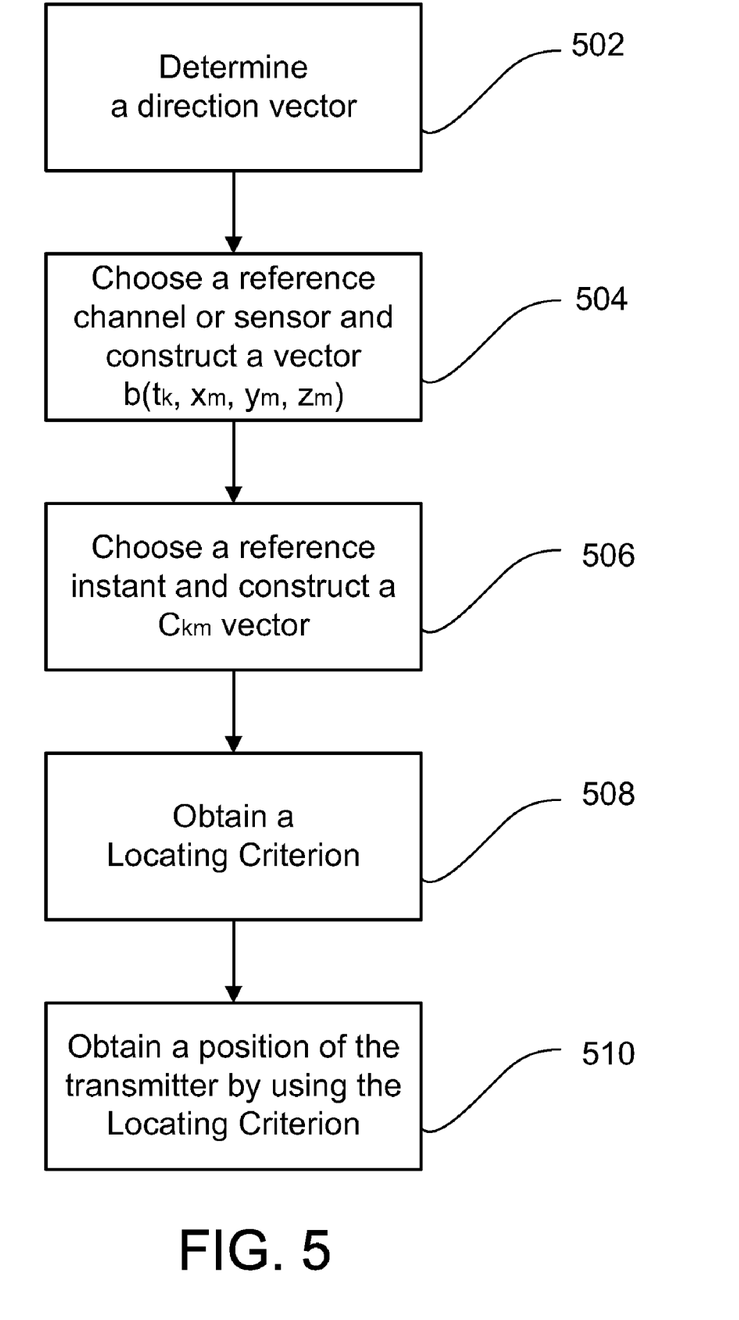
FIG. 5 schematically depicts the process executed by an embodiment of the invention.

Referring to FIG. 3, signals from M transmitters 301, 302, and 303 are received by sensors on an airplane 310. Although only three transmitters 301, 302, and 303 are shown, in some embodiments, there are more or less than three transmitters. Referring to FIG. 4, the airplane is equipped with an array of N sensors 410 and with a processor 420 adapted for executing the disclosed method. Referring to FIG. 5, in step 502, according to a first variant embodiment, the method uses the following direction vector:

$$\hat{a}_{km}(\rho)=a(\theta_k, \Delta_k, \rho)+e_{km} \quad (5)$$

This is used to construct the vector $\hat{b}_{km}$ of dimension (N–1)*1 by choosing a reference sensor, for example the sensor of index 1 (Step 504).

$$\hat{b}_{km} = \begin{bmatrix} \hat{a}_{km}(2)/\hat{a}_{km}(1) \\ \vdots \\ \hat{a}_{km}(n)/\hat{a}_{km}(1) \\ \vdots \\ \hat{a}_{km}(N)/\hat{a}_{km}(1) \end{bmatrix}$$

where $\hat{a}_{km}(n)$ is the $n^{th}$ component of $\hat{a}_{km}$

In this case, the vector $\hat{b}_{km}$ is a function of $\rho$ and is expressed in the following manner:

$$\hat{b}_{km} = b(t_k, x_m, y_m, z_m, \rho) + w_{km} \quad (6)$$

where $$b(t_k, x_m, y_m, z_m, \rho) = \begin{bmatrix} (\rho_2 v_2(\theta_k, \Delta_k))/(\rho_1 v_1(\theta_k, \Delta_k)) \\ \vdots \\ (\rho_N v_N(\theta_k, \Delta_k))/(\rho_1 v_1(\theta_k, \Delta_k)) \end{bmatrix}$$

Accordingly, the vector $\hat{b}_{km}$ is constructed on the basis of the components of the vector $\hat{a}_{km}(\rho)$. For this purpose a reference channel is selected and used to construct the components of the vector as being the ratio of the components of the vector $\hat{a}_{km}$ and a reference channel which is associated for example with the $1^{st}$ component of $\hat{a}_{km}$. Equation (6) corresponds to the choice of sensor 1 as reference sensor.

The vector $\hat{b}_{km}$ is thereafter transformed so as to eliminate the components of the complex vector $\rho_n$. In step 506, for this purpose, the method constructs the vector $\hat{c}_{km}$ of dimension (N–1)×1 by choosing a reference instant, for example k=i:

$$\hat{c}_{km} = \begin{bmatrix} \hat{b}_{km}(1)/\hat{b}_{im}(1) \\ \vdots \\ \hat{b}_{km}(n)/\hat{b}_{im}(n) \\ \vdots \\ \hat{b}_{km}(N-1)/\hat{b}_{im}(N-1) \end{bmatrix} \quad (7)$$

Thus in a low noise context $\mu w_{km}\mu \ll 1$, $\hat{c}_{km}(n)$ has the following expression:

$$\hat{c}_{km}(n) \approx \frac{\tilde{v}_n(\theta_k, \Delta_k, \rho)}{\tilde{v}_n(\theta_i, \Delta_i, \rho)} + \tilde{w}_k(n)$$

where the non calibrated disturbed vector $$\tilde{v}_n(\theta, \Delta, \rho) = \frac{\rho_{n+1}}{\rho_1} \frac{v_{n+1}(\theta_k, \Delta_k)}{v_1(\theta_k, \Delta_k)} \quad (8)$$

with: $\tilde{w}_{km}(n) = \frac{\tilde{v}_n(\theta_i, \Delta_i)w_{km}(n) - \tilde{v}_n(\theta_k, \Delta_k)w_{im}(n)}{(\tilde{v}_n(\theta_i, \Delta_i))^2}$ We note that the ratio $\tilde{v}_n(\theta_k,\Delta_k,\rho)/\tilde{v}_n(\theta_i,\Delta_i,\rho)$ is independent of $\rho$ and equals:

$$G_n(\theta_k, \Delta_k, \theta_i, \Delta_i) = \frac{\tilde{v}_n(\theta_k, \Delta_k, \rho)}{\tilde{v}_n(\theta_i, \Delta_i, \rho)} = \frac{v_{n+1}(\theta_k, \Delta_k)}{v_1(\theta_k, \Delta_k)} \frac{v_1(\theta_i, \Delta_i)}{v_{n+1}(\theta_i, \Delta_i)} \quad (9)$$

Under these conditions the vector $\hat{c}_{km}$ may be written in the following manner:

$$\hat{c}_{km} = c(t_k, x_m, y_m, z_m) + \tilde{w}_{km} \quad (10)$$

where $c(t_k, x_m, y_m, z_m) = \begin{bmatrix} G_1(\theta_k, \Delta_k, \theta_i, \Delta_i) \\ \vdots \\ G_{N-1}(\theta_k, \Delta_k, \theta_i, \Delta_i) \end{bmatrix}$ and $\tilde{w}_{km}(n)$ is the $n^{th}$ component of $\tilde{w}_{km}$ The method having determined the vector $\hat{c}_{km}$, it uses it to locate the transmitters, that is to say to obtain the position $(x_m, y_m, z_m)$ of the transmitter. For this purpose the method maximizes the normalized vector correlation criterion $L_K(x, y, z)$ given by expression (11) in the position space (x,y,z) of a transmitter (Step 508).

$$L_K(x, y, z) = \frac{|c_K^H v_{K,c}(x, y, z)|^2}{(c_K^H c_K)(v_{K,c}(x, y, z)^H v_{K,c}(x, y, z))} \quad (11)$$

with $c_K = \begin{bmatrix} c_{1m} \\ \vdots \\ c_{Km} \end{bmatrix}$ $= v_{K,c}(x_m, y_m, z_m) + w_K, \quad v_{K,C}(x, y, z)$ $= \begin{bmatrix} c(t_1, x, y, z) \\ \vdots \\ c(t_K, x, y, z) \end{bmatrix}$ and $w_K = \begin{bmatrix} \tilde{w}_{1m} \\ \vdots \\ \tilde{w}_{Km} \end{bmatrix}$ In step 510, in order to refine the estimation of the position $(x_m, y_m, z_m)$ of the transmitters, the method can be implemented in an iterative manner. For this purpose, the method executes together for example the following steps:

Step I1 Identification of the vectors $C_{(K+1)m}$ at the instant $t_{k+1}$.

Step I2 Calculation of the criterion $L_{K+1}(x,y,z)$ in an iterative manner and minimization of $L_{K+1}(x,y,z)$ to obtain a new position estimation $(x_m, y_m, z_m)$ for the transmitter and possible loopback to the preceding step.

The noise vector $w_K$ has covariance matrix $R = E[w_K w_K^H]$. By assuming that this matrix R is known, the criterion can be envisaged with a whitening technique.

Under these conditions we obtain the following criterion $L_K'(x,y,z)$:

$$L_K'(x, y, z) = \frac{|c_K^H R^{-1} v_{K,c}(x, y, z)|^2}{(c_K^H R^{-1} c_K)(v_{K,c}(x, y, z)^H R^{-1} v_{K,c}(x, y, z))} \quad (12)$$

with $R = E[w_K w_K^H]$

Other Variant of Implementation of the Method

According to another variant embodiment, the method constructs a vector $\hat{c}'_{km}$ of dimension N×1 on the basis of the direction vector $\hat{a}_{km}$. For this purpose, the method applies a transformation which consists, for example, in choosing a reference instant k=i and in forming the ratios of the components of the vector $\hat{a}_{km}$ with the component corresponding to the instant i. The vector $\hat{c}'_{km}$ is then expressed in the following manner:

$$\hat{c}'_{km} = \begin{bmatrix} \hat{a}_{km}(1)/\hat{a}_{im}(1) \\ M \\ \hat{a}_{km}(n)/\hat{a}_{im}(n) \\ M \\ \hat{a}_{km}(N)/\hat{a}_{im}(N) \end{bmatrix} \quad (13)$$

This corresponds to a temporal tracking of the measurements of the vector $\hat{a}_k$.

Thus in a low noise context $\|e_{km}\| \ll 1$, the components $\hat{c}'_{km}(n)$ of $\hat{c}'_{km}$ have expressions:

$$\hat{c}'_{km}(n) \approx \frac{v_n(\theta_k, \Delta_k)}{v_n(\theta_i, \Delta_i)} + \tilde{\tilde{w}}_{km}(n) \quad (14)$$

with: $\tilde{\tilde{w}}_{km}(n) = \frac{v_n(\theta_i, \Delta_i)e_{km}(n) - v_n(\theta_k, \Delta_k)e_{im}(n)}{(v_n(\theta_i, \Delta_i))^2}$ Under these conditions the vector $\hat{c}'_{km}$ may be written in the following manner:

$$\hat{c}'_{km} \approx c'(t_k, x_m, y_m, z_m) + \tilde{\tilde{w}}_{km} \quad I(15)$$

where $c'(t_k, x_m, y_m, z_m) = \begin{bmatrix} v_1(\theta_k, \Delta_k)/v_1(\theta_i, \Delta_i) \\ M \\ v_N(\theta_k, \Delta_k)/v_N(\theta_i, \Delta_i) \end{bmatrix}$ and $\tilde{\tilde{w}}_{km}(n)$ is the $n^{th}$ component of $\tilde{\tilde{w}}_{km}$ In the case of large running between the measurements, the method can determine vectors $\hat{c}_{km}$ or $\hat{c}'_{km}$ constructed over a sliding time window (rather than over a constant window defined by a reference instant as is the case in the first variant) by taking i=k−1 or i=k−L, where L corresponds to the length of the window (number of measurement samples considered)

The measurement of the direction vectors $\hat{a}_{km}$ is generally obtained to within an undetermined complex factor. For the variant of the method using the vectors $\hat{c}'_{km}$, the method can comprise a step which consists in changing the phase reference of the direction vector measured by choosing a virtual channel as reference (and not a real channel as is the case in the first variant) defined, for example, by the phase barycenter (defined to within a constant scalar coefficient that may arbitrarily be fixed at 1). This operation is carried out, for example, by applying to the measured vectors $\hat{a}_{km}$ the following transformation:

$$\hat{a}'_{km} = \left( \prod_i \frac{\hat{a}_{km}(i)}{|\hat{a}_{km}(i)|} \right)^{-\frac{1}{N}} \hat{a}_{km} \quad (16)$$

The correction coefficient is not fully determined by this expression having regard to the indeterminacy of order N at each instant k of the complex root. A tracking of the phase evolution during the observation period makes it possible to resolve the indeterminacy, as is described hereafter.

The complex correction coefficient being defined to within a factor from among the N $N^{th}$ roots of unity, the phase tracking consists in arbitrarily fixing the first (k=1) correction coefficient (by taking root 1 for example), then in determining at each new iteration k+1, the correction coefficient $\rho$, from among the Nth roots of unity, which minimizes the mean phase deviations between the direction vector $\hat{a}_{(k+1)m}$ measured at the instant k+1 and the corrected vector at the instant k $\hat{a}'_{km}$.

The minimization criterion, for measurements at the same frequency, can be defined by the following expression:

$$\min_{\rho \in \sqrt[N]{1}} \sum_{i \in chanel} \min\left( \mod\left( \left| \arg\left( \frac{\rho \cdot \hat{a}_{k+1,m}(i)}{\hat{a}'_{km}(i)} \right) \right|, 2\pi \right), \right.$$

$$\left. 2\pi - \mod\left( \left| \arg\left( \frac{\rho \cdot \hat{a}_{k+1,m}(i)}{\hat{a}'_{km}(i)} \right) \right|, 2\pi \right) \right) \quad (17)$$

For measurements at different frequencies, it is possible to compare the phases of the components of the two direction vectors by correcting them for a power given by the ratio of these two frequencies.

If we consider the vectors $\hat{c}'_{km}$, it is then possible to compare them with the theoretical values $c'(t_k, x_m, y_m, z_m)$ for which the theoretical direction vector $a(t_k, x_m, y_m, z_m)$ is calculated with reference to the virtual channel defined by the phase barycenter (theoretical geometric phase barycenter which is the geometric locus for which the theoretical sum of the phase differences vanishes). This locus does not coincide, in general, with the phase center of the array (determined experimentally).

Locating the Transmitter on the Basis of the $\hat{c}'_{km}$

The locating method thereafter comprises a step which consists in maximizing the following normalized vector correlation criterion $L_K(x,y,z)$ in the position space (x,y,z) of a transmitter.

$$L_K(x, y, z) = \frac{|c_K'^H v_{K,c'}(x, y, z)|^2}{(c_K'^H c_K')(v_{K,c'}(x, y, z)^H v_{K,c'}(x, y, z))} \quad (18)$$

-continued $$\text{with } c_K' = \begin{bmatrix} c'_{1m} \\ M \\ c'_{Km} \end{bmatrix}$$

$$= v_{K,c'}(x_m, y_m, z_m) + w_K, \; v_{K,c'}(x, y, z)$$

$$= \begin{bmatrix} c'(t_1, x, y, z) \\ M \\ c'(t_K, x, y, z) \end{bmatrix}$$

$$\text{and } w_K = \begin{bmatrix} \tilde{w}_{1m} \\ M \\ \tilde{w}_{Km} \end{bmatrix}$$

To obtain the position $(x_m, y_m, z_m)$ of the transmitter, the method calculates and maximizes the criterion $L_K(x,y,z)$ of equation (18).

In order to refine the estimation of the position $(x_m, y_m, y_m)$ of the transmitters the steps of the method can be conducted in an iterative manner, for example in the following manner:

Step I3 Identification of the vectors $c'_{(K+1)m}$ at the instant $t_{K+1}$.

Step I4 Calculation of the criterion $L_{K+1}(x,y,z)$ in an iterative manner and minimization of $L_{K+1}(x,y,z)$ to obtain a new position estimation $(x_m, y_m, z_m)$ for the transmitter.

The noise vector $w_K$ has covariance matrix $R = E[w_K w_K^H]$. For a known matrix R, the criterion can be envisaged with a whitening technique.

Under these conditions we obtain the following criterion $L_{K}'(x,y,z)$:

$$L_{K'}(x, y, z) = \frac{|c_K'^H R^{-1} v_{K,c'}(x, y, z)|^2}{(c_K'^H R^{-1} c_K')(v_{K,c'}(x, y, z)^H R^{-1} v_{K,c'}(x, y, z))} \quad (19)$$

with $R = E[w_K w_K^H]$

Filtering Step

In the case of a very large number of measurements, the method can for example comprise a step of prior processing of the vectors $a_k$ at the K instants $t_k$. This processing, executed before the steps for determining the coefficients $\hat{c}'_{km}$ or $\hat{c}_{km}$, makes it possible to reduce the numerical complexity of calculation (which is dependent on the number of measurements) by decreasing K. By way of example, it is possible to perform on the elementary measurements the following processings:

decimation of the instants $t_k$, filtering (smoothing of the measurements $\hat{a}_{km}$) and under sampling, merging of the measurements over a defined duration (extraction by association of direction vector and production of synthesis measurements).

In the variant of the method using the vectors $\hat{c}'_{km}$, it is possible to introduce a model on the variation in level of the received signal based, for example, on a free-space propagation model.

The method in its general form, by recourse to the criteria of vector correlation between measurements and models ($L_K(x,y,z)$ and $L_K'(x,y,z)$), can take into account other observation models derived from the direction vectors $a_k$.

In the presence of an array of paired antennas, it is notably possible to define an observation model combining the vectors $b_k$ and $c_K$ or $c'_{km}$.

According to a variant embodiment, it is possible to use the filtering method described in patent application FR 03/13128. If the decimation ratio is significant (non-negligible transit between two filtered measurements), it is also possible to supplement the decimation with an estimation of the variation in direction vector, and more particularly the rate of variation of the differential phase for each of the channels, and to employ a distance-based model utilizing this variation.

Specifically, the phase of each component $b_{k,n}$ of the relative vector $b_k$ is dependent on the incidence $(\theta_k, \Delta_k)$ and on the angle $\alpha_n$ formed by the axis defined by the positions of the aerials of the channels n and 1 with the trajectory of the carrier.

If $\gamma$ is the angle formed by the direction of incidence and the trajectory of the carrier (pseudo bearing), we have:

$$b_{k,n} = \rho_{k,n} e^{j\Delta\varphi_n(t)} \text{ with: } \Delta\varphi_n(t) = 2p\frac{d}{\lambda_0(t)}\cos(\gamma(t) + \alpha_n)$$

The instantaneous variation of differential phase may then be written:

$$\Delta\dot{\varphi}(t) = \frac{V}{D} \cdot \sin(\theta_k) \cdot tg(\theta_k + \alpha_n) \cdot \Delta\varphi(t)$$

from which we derive a relation on the distance of the transmitter:

$$D(t) = \frac{V}{\Delta\dot{\varphi}(t)} \cdot \sin(\theta_k) \cdot tg(\theta_k + \alpha_n) \cdot \Delta\varphi(t) \quad (20)$$

This relation then makes it possible, as an adjunct to the vectors $b_k$ or $c_k$, to employ the estimations of instantaneous variation of differential phase by introducing a distance model into the correlation criterion $L_K(x,y,z)$.

In the case where $\gamma=0$ (aerials along the axis of the carrier), the relations may be written:

$$\frac{b_{k,n}}{|b_{k,n}|} = \exp\left(j2\pi\frac{d}{\lambda}\cos(\theta(t_k, x_m, y_m, z_m))\cos(\Delta(t_k, x_m, y_m, z_m))\right)$$

$$D(t) = \left(\cos(\theta) - \frac{1}{\cos(\theta)}\right)\frac{V}{\Delta\dot{\varphi}(t)}\Delta\varphi(t).$$

The invention claimed is:

1. A method of locating one or more transmitters on the basis of an array of sensors moving with respect to the transmitters, comprising at least the following steps for an m-th transmitter of the transmitters:
determining a direction vector $\hat{a}_{km}$ corresponding to the response of the array of sensors to a source with incidence $(\theta, \Delta)$ as a function of the incidence parameters $\theta$, $\Delta$, and of an unknown parameter $\rho$ related to the distortion of the phases on the sensors,
transforming the direction vector so as to eliminate the unknown parameter $\rho$, into a transformed direction vector,
using the transformed direction vector to obtain the position of the transmitter using a maximized locating criterion;

wherein the transformation step comprises at least the following steps:
choosing a reference instant i, and
constructing the transformed direction vector $\hat{c}'_{km}$ whose components correspond to the ratio of the components between the given instant k and the instant i $$\hat{c}'_{km} = \begin{bmatrix} \hat{a}_{km}(1)/\hat{a}_{im}(1) \\ \vdots \\ \hat{a}_{km}(n)/\hat{a}_{im}(n) \\ \vdots \\ \hat{a}_{km}(N)/\hat{a}_{im}(N) \end{bmatrix},$$

$\hat{a}_{im}$ is the direction vector at the reference instant i.

2. The method as claimed in claim 1, wherein the locating criterion is equal to:

$$L_K(x,y,z) = \frac{|c'^H_K v_{K,c'}(x,y,z)|^2}{(c'^H_K c'_K)(v_{K,c'}(x,y,z)^H v_{K,c'}(x,y,z))}$$

with $c'_K = \begin{bmatrix} c'_{1m} \\ \vdots \\ c'_{Km} \end{bmatrix} = v_K, C'(x_m, y_m, z_m) + w_K,$ $$v_K, C'(x,y,z) = \begin{bmatrix} c'(t_1, x, y, z) \\ \vdots \\ c'(t_K, x, y, z) \end{bmatrix}$$

and $$w_K = \begin{bmatrix} \tilde{w}_{1m} \\ \vdots \\ \tilde{w}_{Km} \end{bmatrix}$$

noise vector for all the components.

3. The method as claimed in claim 1, further comprising the following iterative steps:
identifying vectors $c'_{(K+1)m}$ at an instant $t_{K+1}$;
calculating a criterion $L_{K+1}(x,y,z)$ in an iterative manner and minimizing the criterion $L_{K+1}(x,y,z)$ to obtain a new position estimation $(x_m, y_m, z_m)$ for the transmitter.

4. The method as claimed in claim 1, wherein a phase tracking is performed for the vectors $\hat{c}'_{km}$.

5. The method as claimed in claim 1, further comprising a step of filtering the direction vectors $\hat{a}_k$.

6. The method as claimed in claim 1 wherein a sliding time window is used by taking i=k−1 or i=k−L.

7. The method as claimed in claim 2, further comprising the following iterative steps:
identifying vectors $c'_{(K+1)m}$ at an instant $t_{K+1}$;
calculating a criterion $L_{K+1}(x,y,z)$ in an iterative manner and minimizing the criterion $L_{K+1}(x,y,z)$ to obtain a new position estimation $(x_m, y_m, z_m)$ for the transmitter.

8. A method of locating one of more transmitters on the basis of an array of sensors moving with respect to the transmitters which comprises at least the following steps:
receiving signals from at least one of the transmitters by the sensors and determining a direction vector $\hat{a}_{km}$;
choosing a reference channel or sensor and constructing a vector $b(t_K, x_m, z_m, \rho)$ whose components correspond to the ratio of 2 channels according to the received signals, where m denotes the m-th transmitter of the transmitters;

$$\begin{bmatrix} (\rho_2 v_2(\theta_k, \Delta_k))/(\rho_1 v_1(\theta_k, \Delta_k)) \\ \vdots \\ (\rho_N v_N(\theta_k, \Delta_k))/(\rho_1 v_1(\theta_k, \Delta_k)) \end{bmatrix}$$

choosing a reference instant and constructing on the basis of the vector $b(t_k, x_m, y_m, z_m, \rho)$ a vector whose components are:

$$\hat{b}_{km} = \begin{bmatrix} \hat{a}_{km}(2)/\hat{a}_{km}(1) \\ \vdots \\ \hat{a}_{km}(n)/\hat{a}_{km}(1) \\ \vdots \\ \hat{a}_{km}(N)/\hat{a}_{km}(1) \end{bmatrix}$$

where $\hat{a}_{km}(n)$ is the $n^{th}$ component of $\hat{a}_{km}$ constructing a transformed direction vector $\hat{c}_{km}$ $$\hat{c}_{km} = \begin{bmatrix} \hat{b}_{km}(1)/\hat{b}_{im}(1) \\ \vdots \\ \hat{b}_{km}(n)/\hat{b}_{im}(n) \\ \vdots \\ \hat{b}_{km}(N-1)/\hat{b}_{im}(N-1) \end{bmatrix} ; \text{ and}$$

using the transformed direction vector to obtain the position of the transmitters using a maximized locating criterion;

wherein m is the amount of transmitters, and N is the amount of sensors.

9. A method of locating one of more transmitters on the basis of an array of sensors moving with respect to the transmitters, comprising at least the following steps for an m-th transmitter of the transmitters:

receiving signals from at least on of the transmitters by the sensors;

using the received signals to construct a direction vector:

$$\hat{a}_{km}(\rho) = a(\theta_k, \Delta_k, \rho) + e_{km}$$

constructing a vector $\hat{b}_{km}$ of dimension $(N-1)*1$ $$\hat{b}_{km} = \begin{bmatrix} \hat{a}_{km}(2)/\hat{a}_{km}(1) \\ \vdots \\ \hat{a}_{km}(n)/\hat{a}_{km}(1) \\ \vdots \\ \hat{a}_{km}(N)/\hat{a}_{km}(1) \end{bmatrix}$$

where $\hat{a}_{km}(n)$ is the $n^{th}$ component of $\hat{a}_{km}$ wherein the vector $\hat{b}_{km}$ is a function of $\rho$ and is expressed in the following manner:

$$\hat{b}_{km} = b(t_k, x_m, y_m, z_m, \rho) + w_{km} \text{ where } b(t_k, x_m, y_m, z_m, \rho) =$$

$$\begin{bmatrix} (\rho_2 v_2(\theta_k, \Delta_k))/(\rho_1 v_1(\theta_k, \Delta_k)) \\ \vdots \\ (\rho_N v_N(\theta_k, \Delta_k))/(\rho_1 v_1(\theta_k, \Delta_k)) \end{bmatrix}$$

and wherein the vector $\hat{b}_{km}$ is constructed on the basis of the components of the vector $\hat{a}_{km}(\rho)$;

transforming the vector $\hat{b}_{km}$ so as to eliminate the components of the complex vector $\rho_n$;

constructing a vector $\hat{c}_{km}$ of dimension $(N-1)\times 1$ by choosing a reference instant wherein k=i:

$$\hat{c}_{km} = \begin{bmatrix} \hat{b}_{km}(1)/\hat{b}_{im}(1) \\ \vdots \\ \hat{b}_{km}(n)/\hat{b}_{im}(n) \\ \vdots \\ \hat{b}_{km}(N-1)/\hat{b}_{im}(N-1) \end{bmatrix} ; \text{ and}$$

using the vector $\hat{c}_{km}$ to obtain the position of the transmitter using a maximized locating criterion.

10. The method as claimed in claim 9, wherein the locating criterion comprises a normalized vector correlation criterion $L_k(x, y, z)$ in the position space (x, y, z) of a transmitter with:

$$L_K(x, y, z) = \frac{|c_K^H v_{K,c}(x, y, z)|^2}{(c_K^H c_K)(v_{K,c}(x, y, z)^H v_{K,c}(x, y, z))}$$

$$\text{with } c_K = \begin{bmatrix} c_{1m} \\ \vdots \\ c_{Km} \end{bmatrix} = v_{K,c}(x_m, y_m, z_m) + w_K,$$

$$v_{K,c}(x, y, z) = \begin{bmatrix} c(t_1, x, y, z) \\ \vdots \\ c(t_K, x, y, z) \end{bmatrix}$$

and $$w_K = \begin{bmatrix} \tilde{w}_{1m} \\ \vdots \\ \tilde{w}_{Km} \end{bmatrix}$$

noise vector for all the positions of the transmitter.

11. The method as claimed in claim 10, further comprising the following iterative steps:

identifying the vectors $c_{(K+1)m}$ at an instant $t_{k+1}$;

calculating a criterion $L_{K+1}(x,y,z)$ in an iterative manner and minimizing the criterion $L_{K+1}(x,y,z)$ to obtain a new position estimation $(x_m, y_m, z_m)$ for the transmitter.

12. The method as claimed in claim 10, further comprising the following iterative steps:

identifying the vectors $c_{(K+1)m}$ at an instant $t_{k+1}$;

calculating a criterion $L_{K+1}(x,y,z)$ in an iterative manner and minimizing the criterion $L_{K+1}(x,y,z)$ to obtain a new position estimation $(x_m, y_m, z_m)$ for the transmitter.

* * * * *